United States Patent
Raeder et al.

(10) Patent No.: US 7,399,414 B2
(45) Date of Patent: Jul. 15, 2008

(54) WET OXIDATION WITH THE AID OF A POROUS CATALYTIC CONTACTOR

(75) Inventors: Henrik Raeder, Oslo (NO); Rune Bredesen, Oslo (NO); Sylvain Miachon, Lyons (FR); Jean-Alain Dalmon, Lyons (FR)

(73) Assignee: Due Miljo AS, Oslo (NO)

( * ) Notice: Subject to any disclaimer, the term of this patent is extended or adjusted under 35 U.S.C. 154(b) by 407 days.

(21) Appl. No.: 10/471,334

(22) PCT Filed: Mar. 11, 2002

(86) PCT No.: PCT/NO02/00100
§ 371 (c)(1),
(2), (4) Date: Mar. 8, 2004

(87) PCT Pub. No.: WO02/074701
PCT Pub. Date: Sep. 26, 2002

(65) Prior Publication Data
US 2004/0149664 A1    Aug. 5, 2004

(30) Foreign Application Priority Data
Mar. 12, 2001    (NO) .................................. 20011238

(51) Int. Cl.
*C02F 1/72*    (2006.01)
(52) U.S. Cl. ................ 210/638; 210/639; 210/644; 210/758; 210/759; 210/763
(58) Field of Classification Search ............... 210/638, 210/762, 763, 644, 649, 758–761, 640, 639; 502/325, 334
See application file for complete search history

(56) References Cited

U.S. PATENT DOCUMENTS

| | | | |
|---|---|---|---|
| 3,104,951 A * | 9/1963 | Urban | ..................... 423/576.4 |
| 4,455,236 A | 6/1984 | Kim | |
| 4,743,381 A * | 5/1988 | Bull | ........................... 210/763 |
| 5,047,381 A | 9/1991 | Beebe | |
| 5,120,453 A * | 6/1992 | Frame et al. | ................ 210/759 |
| 5,350,516 A * | 9/1994 | Bhadra | ........................ 210/763 |
| 6,004,469 A | 12/1999 | Sanders et al. | |
| 6,042,734 A * | 3/2000 | Martin et al. | ................ 210/763 |
| 6,309,550 B1 * | 10/2001 | Iversen et al. | ............... 210/644 |
| 6,403,031 B1 * | 6/2002 | Escude et al. | .................. 422/28 |
| 6,793,711 B1 * | 9/2004 | Sammells | ........................ 95/48 |

FOREIGN PATENT DOCUMENTS

EP    0 887 312    12/1998

* cited by examiner

*Primary Examiner*—Joseph W Drodge
(74) *Attorney, Agent, or Firm*—Lipsitz & McAllister, LLC

(57) ABSTRACT

A process for oxidation of oxidizable materials which are dissolved or suspended in a liquid phase. A contactor in the form of a porous membrane is used. The contactor is designed such that an oxidizing phase flows along one surface thereof while the phase to be oxidized flows along another surface. The oxidation is catalyzed by (i) a catalyst material which constitutes the porous membrane or is deposited in or onto a porous membrane support, or (ii) a catalyst material which is supplied to one or both of the feed streams comprising the oxidizing phase and the phase to be oxidized.

11 Claims, 4 Drawing Sheets

WET OXIDATION WITH THE AID OF A POROUS CATALYTIC CONTACTOR

This application claims the benefit of international application number PCT/NO02/00100 filed Mar. 11, 2002, which claims priority of Norwegian patent application 20011238 filed Mar. 12, 2001. The international application was published under PCT Article 21(2) in the English language.

The present invention relates to a liquid treatment by catalytic oxidation.

To achieve oxidation of oxidizable, dissolved or suspended substances or particulate material in a liquid phase, the oxidation process of the present invention utilizes a catalytic contact element, hereafter called a contactor.

The primary application of the present invention is to overcome problems associated with the treatment of industrial waste water and to facilitate the re-use of water, minerals and other raw materials in industrial processes. In addition, the invention's process would be useful in breaking down toxic substances and substances that are not biodegradable. The invention's process makes it possible to achieve oxidation in the liquid phase at a lower pressure and temperature than what is feasible with today's processes for wet oxidation and combustion. Also, the process has lower space requirements than do today's processes for biological treatment of waste. The low temperature leads to fewer corrosion problems in the processing equipment than with today's equipment for wet oxidation, enabling the use of less expensive materials. The result is that the process of the present invention is less demanding with regard to energy and costs, both for investment and operation, than the current technology. Furthermore, the present invention's process has a wide range of applications.

The invention's process would also be useful for purposes other than waste treatment, for example, for controlled oxidation in the manufacturing of chemicals and products.

The oxidizable suspended or dissolved material in the liquid may originate from any source whatsoever. For example, it may be waste water from industry, agriculture or a similar activity, especially, of course, in those situations where a discharge of this type of oxidizable material would constitute a strain on, or contamination of, the exterior environment.

In given situations, such a process also permits a recovery of the oxidizable material after the oxidation, and it enables a far greater degree of recycling of purified waste water instead of discharge.

The present invention makes use of a technology that utilizes a porous, catalytic contactor. This porous, catalytic contactor consists essentially of a porous membrane support that is loaded with a heterogeneous catalyst.

The porous contactor may consist of one or several layers made of oxides, polymers or any other materials, and may have any convenient and expedient shape whatsoever, for example, a tube, a hollow fiber, a multichannel tube, or a plate, or it may have any other practical form.

As the catalyst there may be used a precious metal, a non-precious metal, a metal oxide or any other material. It is also possible that the contactor-will not be loaded with a separate catalytic material, but that the porous membrane material in itself will have a catalyzing effect for the oxidation reaction.

In the process according to the invention, one or both of the feed streams can contain a homogeneous catalyst or one or both of the feed streams can contain a heterogeneous catalyst.

Further the catalyst may be supplied batchwise together with either of the two feed streams or the catalyst may be supplied batchwise during intervals while one or both of the two feed streams are temporarily stopped.

The oxidizing phase is a fluid, thus it is a gas or a liquid containing an oxidizing agent that may be air, oxygen, oxygen-enriched air, ozone, hydrogen peroxide, or another oxidizing agent.

The resulting process according to the invention can be carried out in accordance with various process modes, for example, in batches, by recycling, by continuous feeding and bleeding, or by a continuous flow-through method.

In accordance with this the present invention relates to a process for the oxidation of oxidizable materials which are dissolved or suspended in a liquid phase, and the invention is characterized in that there is used a contactor in the form of a porous membrane, said contactor being designed such that an oxidizing phase flows along one surface of the contactor while the phase to be oxidized flows along the other, and in that the oxidation is catalysed by (i) a catalyst material which constitutes the porous membrane or is deposited in or onto a porous membrane support, or catalysed by (ii) a catalyst material which is supplied to one or both of the feed streams comprising the oxidizing phase and the phase to the oxidized, respectively, which flow along said porous membrane support.

In one embodiment there is as contactor used a porous, ceramic support having a platinum-containing top layer as catalyst.

In a further embodiment there is as porous membrane catalyst support used an oxide, another inorganic material, an organic polymer material or any material.

The catalyst may be a precious metal, a non-precious metal, an oxide or any other: material.

The invention shall be described below in more detail with reference to the attached figures, wherein.

Figure 1:
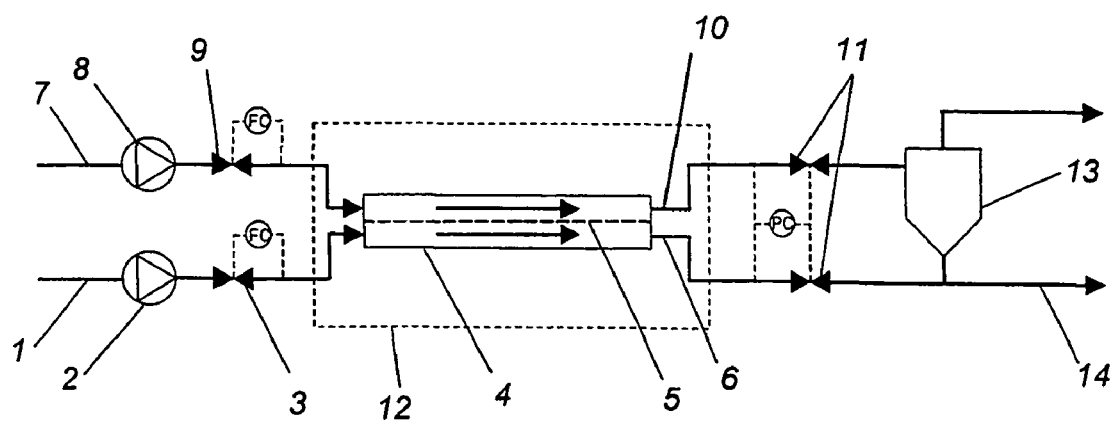
FIG. 1 shows a flow chart for a general apparatus that utilizes the invention's process.

In FIG. 1 is shown a flow chart of an apparatus that utilizes the invention's process. The liquid or suspension to be oxidized enters the pump 2 at 1. The flow rate is regulated by a valve 3, which is coupled to a flow regulator, and the liquid is conducted into the reactor 4 on one side of the catalytic contactor 5. The liquid is conducted on the one side of the contactor, along the contactor's porous surface, and is passed out of the reactor at 6. The oxidizing agent, which may be air, oxygen, enriched air, hydrogen peroxide or another oxidizing agent, is introduced at 7 to the pump or the compressor 8. The flow rate of the oxidizing agent is regulated by a valve 9, which is coupled to a flow regulator, and the liquid is conducted into the reactor 4 on the other side of the catalytic contactor 5. The oxidizing agent is conducted on the other side of the contactor, along the contactor's porous surface, and is passed out of the reactor at 10. In the illustrated case, the two streams are conducted co-currently on each side of the porous catalytic contactor, but it is also conceivable that the two streams can be conducted counter-currently or cross-currently on each side of the contactor. The pressure conditions in the reactor 4 and the pressure difference between the two sides of the contactor 5 are regulated by means of valves 11 coupled to pressure regulators at the outlets from the reactor. The temperature in the reactor is constantly maintained at the desired level with the aid of a heating/cooling system 12, which may also provide for the recovery of heat. In those cases where the oxidizing agent is a gas, the outlet from this side of the contactor may be connected to a separator 13, such that any liquid in this outlet can be fed into the oxidized liquid stream 14.

Figure 2:
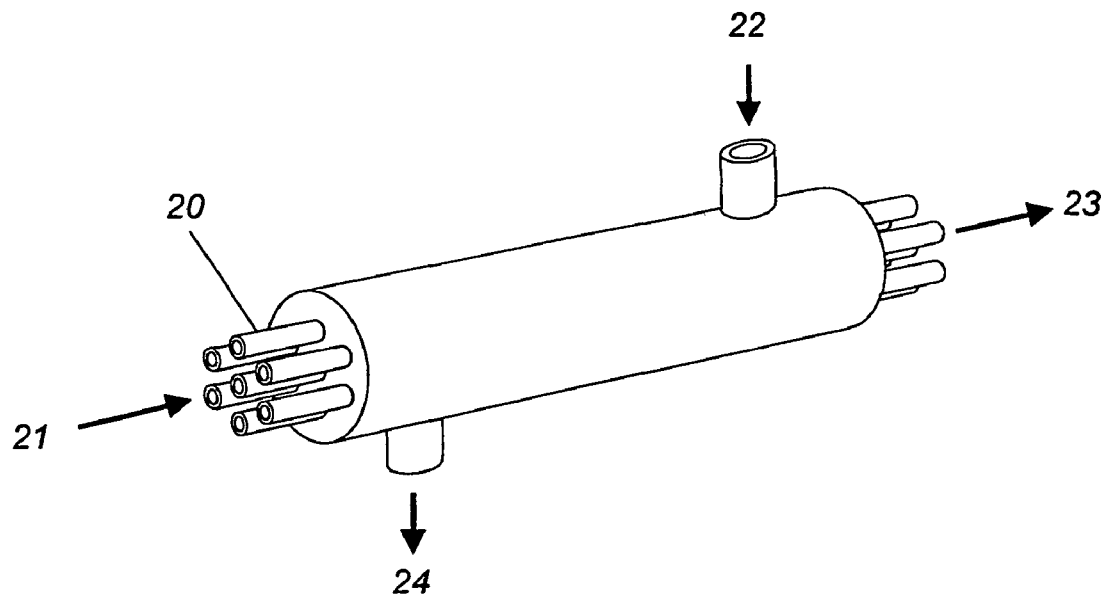
FIGS. 2 and 3 show two examples of the way the catalytic contactor can be arranged in the reactor in order to utilize the invention's process.
Figure 3:
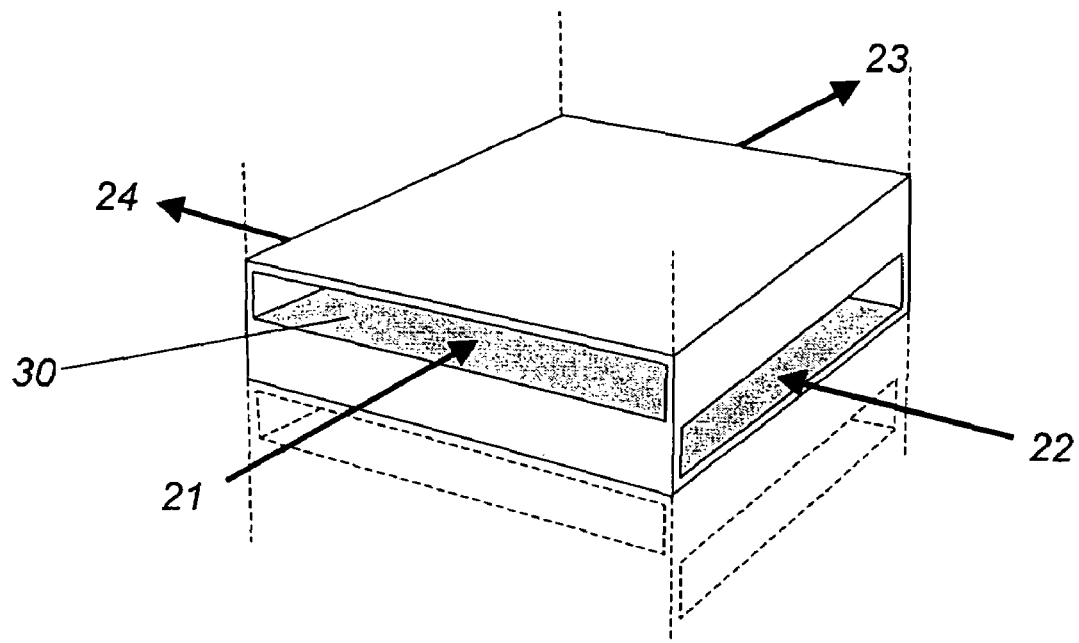

In FIGS. 2 and 3 are shown two alternative embodiments of the reactor. FIG. 2 shows a reactor composed of a plurality of tubular contactors 20, whereas FIG. 3 shows parts of a reactor assembled from a plurality of plate-shaped contactors 30. The oxidizable liquid is fed in at 21, and the oxidizing agent is introduced at 22. The oxidized liquid is passed out at 23, whereas unused oxidizing agent and portions of the oxidation products are removed at 24. Alternatively the streams can be exchanged such that the oxidizable liquid is introduced at 22 and the oxidizing agent is introduced at 21. The oxidized liquid is then brought out at 24, whereas unused oxidizing agent and parts of the oxidation products are passed out at 23.

Figure 4:
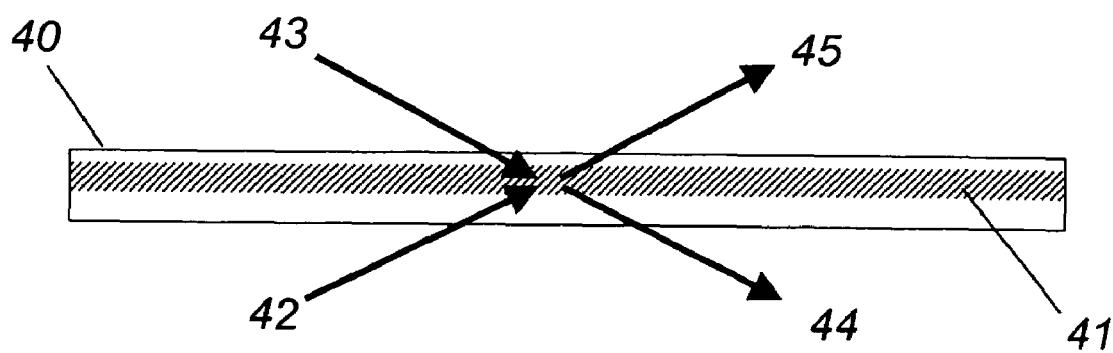
FIG. 4 shows the principle for the oxidation in the catalytic contactor according to the invention.

FIG. 4 illustrates the principle for the invention's mode of operation. In the porous contactor 40 there is a tone with a material 41 which functions as a catalyst for the oxidation. The oxidizable material 42, which may be, for example, organic molecules dissolved in water, is conducted toward the one side of the porous contactor. The oxidizing agent 43 is conducted in toward the other side of the contactor. The oxidizable material diffuses into the pores of the contactor, where it meets the oxidizing agent on, or in the proximity of, the catalyst 41, which causes a spontaneous oxidation of the oxidizable material to take place. The reaction products 44 and 45 from the oxidation, which may be in gas or liquid form, diffuse out of the contactor on one or both of the element's two sides. The reaction products may be completely oxidized substances, for example, water, carbonates, carbon dioxide or nitrogen oxides, or partially oxidized substances, for example, carboxylic acids.

Figure 5:
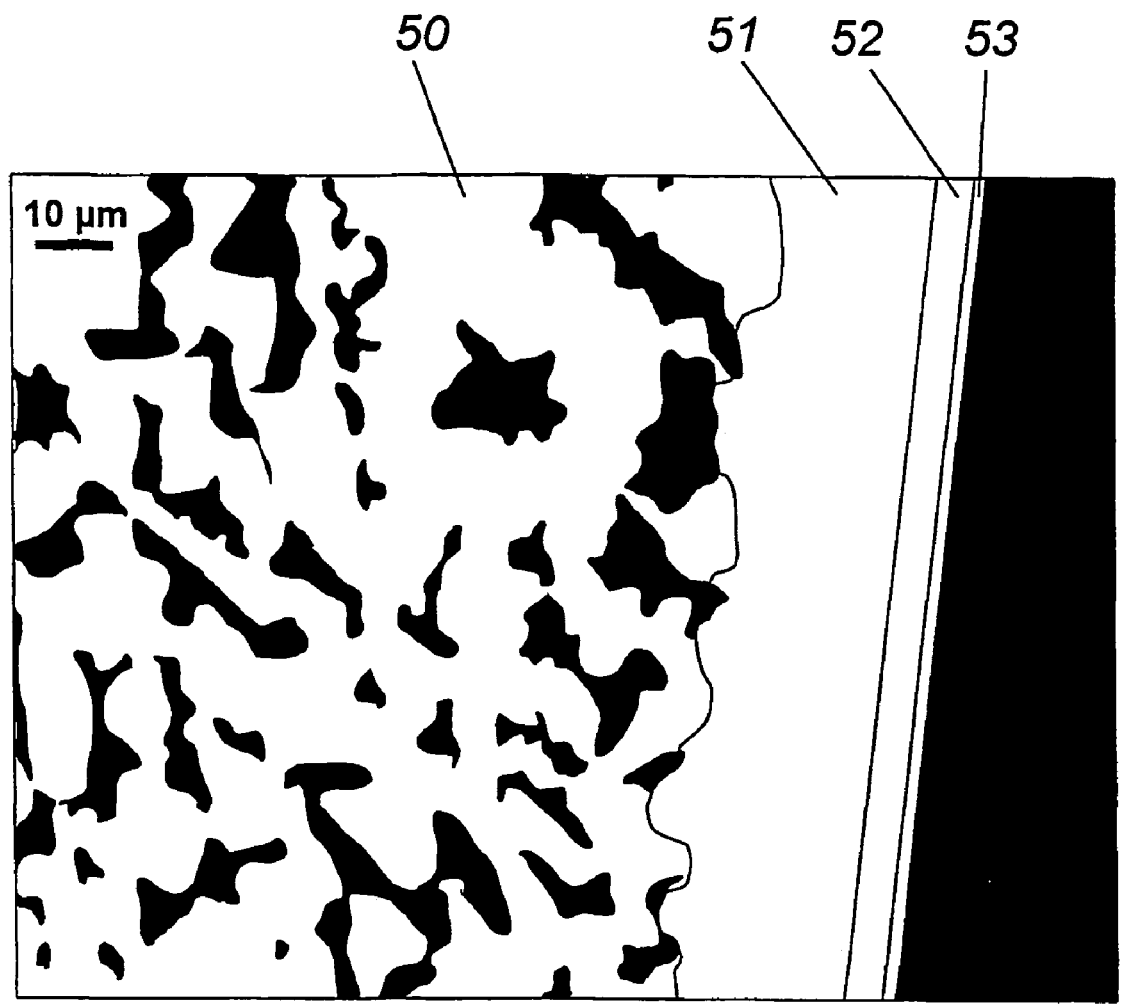
FIG. 5 shows a drawing based on a microphotograph in cross section and an embodiment form of a contactor with a catalyst according to the invention.

FIG. 5 shows a drawing based on a microphotograph of a contactor. In the illustrated case, the support layer 50 has an average pore diameter in the range 5 to 10 μm to obtain very weak hydraulic resistance and a thickness of a few mm.

Onto this support, is laid an intermediary layer 51 in the microfiltration range. The thickness is around 20 μm.

Onto this intermediate layer, is laid an additional intermediate layer 52 in the ultrafiltration range with a thickness around 5 μm. This additional intermediate layer contains some of the catalyst, in this case platinum. The support layer and the first intermediate layer do not, in this case, contain catalyst.

Finally, the contactor comprises a top layer 53 with a thickness around 1 μm. This layer contains platinum as catalyst.

Figure 6:
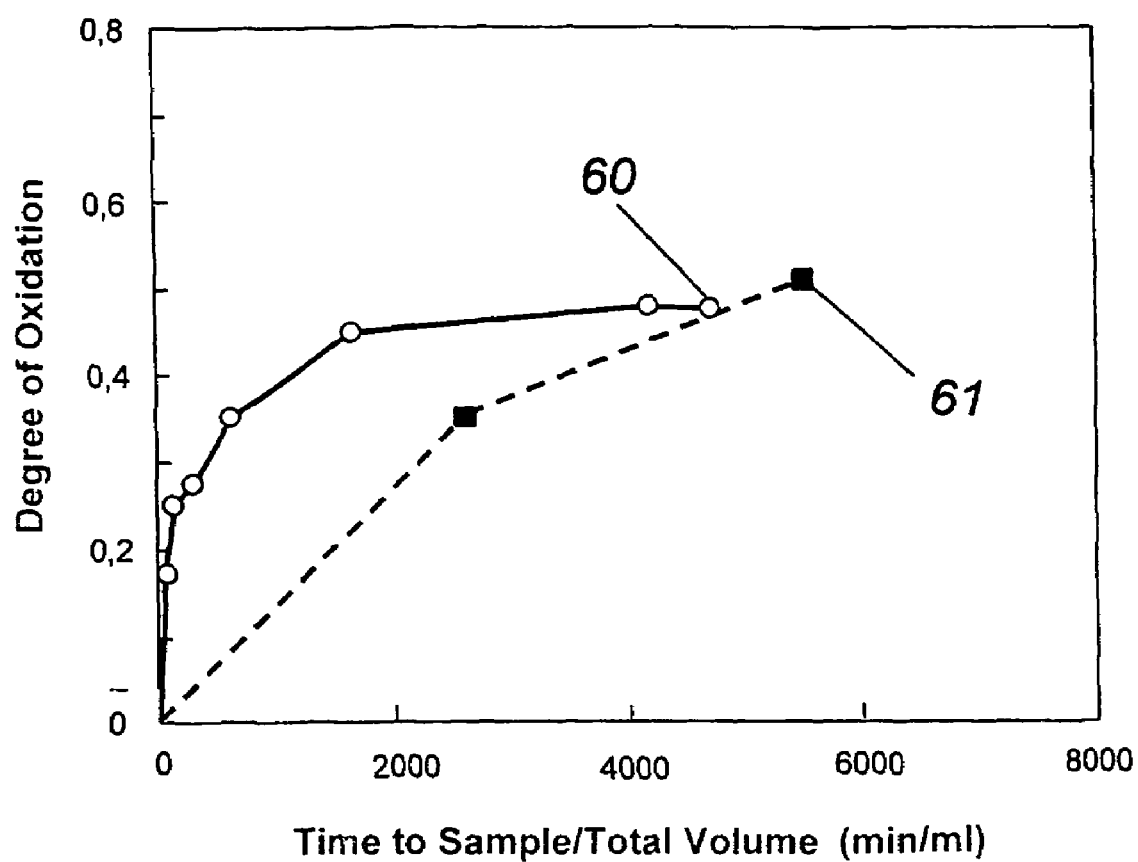
FIG. 6 shows curves illustrating test results obtained through the use of the invention's process.

FIG. 6 shows the results that were obtained through the use of a contactor with catalyst as shown in FIG. 5. The contactor in this case was shaped as a tube having a length of 100 mm, an outer diameter of 10 mm, and an inner diameter of 6 mm. FIG. 5 shows the cross section of an area near the inner surface of a similar tube. The reactor was utilized with a model solution consisting of 5 g/l of formic acid in water. A reservoir that contained between 1 and 2 liters of test solution was used for each test, and the solution was pumped from the reservoir, through the reactor, and back to the, reservoir in a recycling loop. Through the reactor the solution was conducted along the outside of the contactor tube. The fluid velocity was 50 ml/min. At the same time, compressed air was conducted through the tube at a velocity of between 50 and 100 mil/min. Samples of the solution were taken from the outlet of the reactor at irregular intervals. Standard methods for chemical analysis were used to determine the content of oxidizable material (chemical oxygen demand, COD) or the content of organic bound carbon (total organic carbon, TOC) in these samples. The results from these analyses were converted to degree of oxidation by dividing the values by correspondingly calculated values for the model solution prior to the tests. The degree of oxidation constitutes the Y-axis in FIG. 6. The X-axis represents the time from start of the test to the time when the sample was taken, divided by the total volume of model solution in the apparatus at the specified test. In one of the tests, which yielded the results indicated by the points marked 60 in FIG. 6, the pressure in the apparatus was 1 bar and the temperature was 80° C. In another test, which yielded the results indicated by the points marked 61 in FIG. 6, the pressure was 10 bars and the temperature was 150° C. In both of the tests, the pressure difference between the two sides of the contactor was less than 0.2 bar.

The results of the tests that are shown in FIG. 6 indicate that it is possible to achieve over 50% oxidation of formic acid under very mild processing conditions. Even at a pressure of 1 bar and only 80° C. it is possible to achieve nearly 50% oxidation. In connection with the tests mentioned above, a test was also conducted with a contactor that was not impregnated with catalyst. This test was carried out at a pressure of 10 bars and a temperature of 150° C., and the results showed that no measurable oxidation took place in this case.

The invention claimed is:

1. A process for wet oxidation of oxidizable materials which are dissolved or suspended in a liquid phase, comprising:

providing a contactor in the form of a porous membrane, said contactor being designed such that an oxidizing phase containing an oxidizing agent flows along one surface of the contactor in a first feed stream which diffuses into the porous membrane and the liquid phase to be wet oxidized flows along the other surface of the contactor in a second feed stream which diffuses into the porous membrane, and catalyzing the wet oxidation of the oxidizable material in said liquid phase by one of (i) a catalyst material which constitutes the porous membrane or is deposited in or onto a porous membrane support, and (ii) a catalyst material which is supplied to at least one of the first and second feed streams, wherein the catalyst material remains unchanged by said oxidation; and said oxidation occurs within said porous membrane.

2. The process according to claim 1, wherein the contactor comprises a porous, ceramic support having a platinum-containing top layer as catalyst.

3. The process according to claim 2, wherein the oxidizing a agent comprises one of air, oxygen-enriched air, oxygen, ozone, and hydrogen peroxide.

4. The process according to claim 1, wherein the oxidizing agent comprises one of air, oxygen-enriched air, oxygen, ozone, and hydrogen peroxide.

5. The process according to claim 1, wherein the contactor has a shape of one of a tube, a hollow fiber, a multichannel tube, and a plate.

6. The process according to claim 1, wherein the porous membrane support comprises one of an oxide, an inorganic material, and an organic polymer material.

7. The process according to claim 1, wherein the catalyst material comprises one of a precious metal, a non-precious metal, and an oxide.

8. The process according to claim 1, wherein one or both of the feed streams contain a heterogeneous catalyst.

9. The process according to claim 1, wherein one or both of the feed streams contain a homogeneous catalyst.

10. The process according to claim 1, wherein the catalyst material is supplied batchwise together with either of the two feed streams.

11. The process according to claim 1, wherein the catalyst material is supplied batchwise during intervals while at least one of the feed streams is temporarily stopped.

* * * * *